(12) United States Patent
Kamon

(10) Patent No.: US 10,510,158 B1
(45) Date of Patent: Dec. 17, 2019

(54) COLLABORATIVE AIRBORNE OBJECT TRACKING SYSTEMS AND METHODS

(71) Applicant: Amazon Technologies, Inc., Seattle, WA (US)

(72) Inventor: Ishay Kamon, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 44 days.

(21) Appl. No.: 15/811,557

(22) Filed: Nov. 13, 2017

(51) Int. Cl.
| | | |
|---|---|---|
| *G06K 9/00* | (2006.01) | |
| *G06T 7/70* | (2017.01) | |
| *B64C 39/02* | (2006.01) | |
| *H04N 5/247* | (2006.01) | |
| *B64D 47/08* | (2006.01) | |

(52) U.S. Cl.
CPC .............. *G06T 7/70* (2017.01); *B64C 39/024* (2013.01); *B64D 47/08* (2013.01); *H04N 5/247* (2013.01); *B64C 2201/127* (2013.01); *B64C 2201/141* (2013.01)

(58) Field of Classification Search
CPC ............ B64C 39/024; B64C 2201/141; B64C 2201/127; B64C 2201/123; B64C 2201/146; B64C 2201/024; B64C 2201/08; B64C 2201/108; B64C 2201/128; B64C 27/00; B64C 39/02; B64C 39/028; G06T 7/00; G06T 2207/10012; G06T 7/292; G05D 1/12; G05D 1/0251; G05D 1/0287; G05D 1/101; G05D 1/0202
See application file for complete search history.

(56) References Cited

U.S. PATENT DOCUMENTS

| | | | | | |
|---|---|---|---|---|---|
| 9,367,067 | B2 * | 6/2016 | Gilmore | ................. | G05D 1/101 |
| 9,407,881 | B2 * | 8/2016 | Renkis | .................... | H04N 7/181 |
| 2004/0030571 | A1 * | 2/2004 | Solomon | ................. | F41H 13/00 |
| | | | | | 700/248 |
| 2005/0218259 | A1 * | 10/2005 | Kamon | ................... | F41G 3/326 |
| | | | | | 244/3.15 |
| 2017/0069214 | A1 * | 3/2017 | Dupray | ............... | G08G 5/0021 |
| 2017/0274275 | A1 * | 9/2017 | Vandonkelaar | ....... | A63F 13/212 |
| 2017/0333777 | A1 * | 11/2017 | Spivak | ............... | A63B 71/0605 |
| 2018/0095469 | A1 * | 4/2018 | Leurent | ................ | G05D 1/0094 |

OTHER PUBLICATIONS

Brust et al. ("Target Tracking Optimization of UAV Swarms Based on Dual-Pheromone Clustering". In: 3rd IEEE International Conference on Cybernetics (CYBCONF) Jun. 21-23, 2017, pp. 1-8 (Year: 2017).*

* cited by examiner

*Primary Examiner* — Bhavesh M Mehta
*Assistant Examiner* — Ian L Lemieux
(74) *Attorney, Agent, or Firm* — Athorus, PLLC

(57) ABSTRACT

Systems and methods related to identifying locations and/or ranges to objects using airborne imaging devices are disclosed. An object tracking system may include a plurality of aerial vehicles having associated imaging devices and a control station. Information related to positions and orientations of aerial vehicles and associated imaging devices may be received. In addition, imaging data may be received and processed to identify optical rays associated with objects within the imaging data. Further, a three-dimensional mapping of the identified optical rays may be generated, and locations or ranges of the objects relative to the aerial vehicles may be determined based on any intersections of optical rays within the three-dimensional mapping.

19 Claims, 9 Drawing Sheets

COLLABORATIVE AIRBORNE OBJECT TRACKING SYSTEMS AND METHODS

BACKGROUND

Generally, aerial vehicles may include specialized hardware or sensors to track objects in proximity and to determine relative ranges to such objects. For example, the specialized hardware or sensors may include radar sensors, LIDAR sensors, laser rangefinders, or other similar specialized hardware. However, such specialized hardware may add complexity, weight, and cost to aerial vehicles. Accordingly, there is a need for systems and methods to track objects without the additional complexity, weight, or cost of specialized hardware or sensors.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
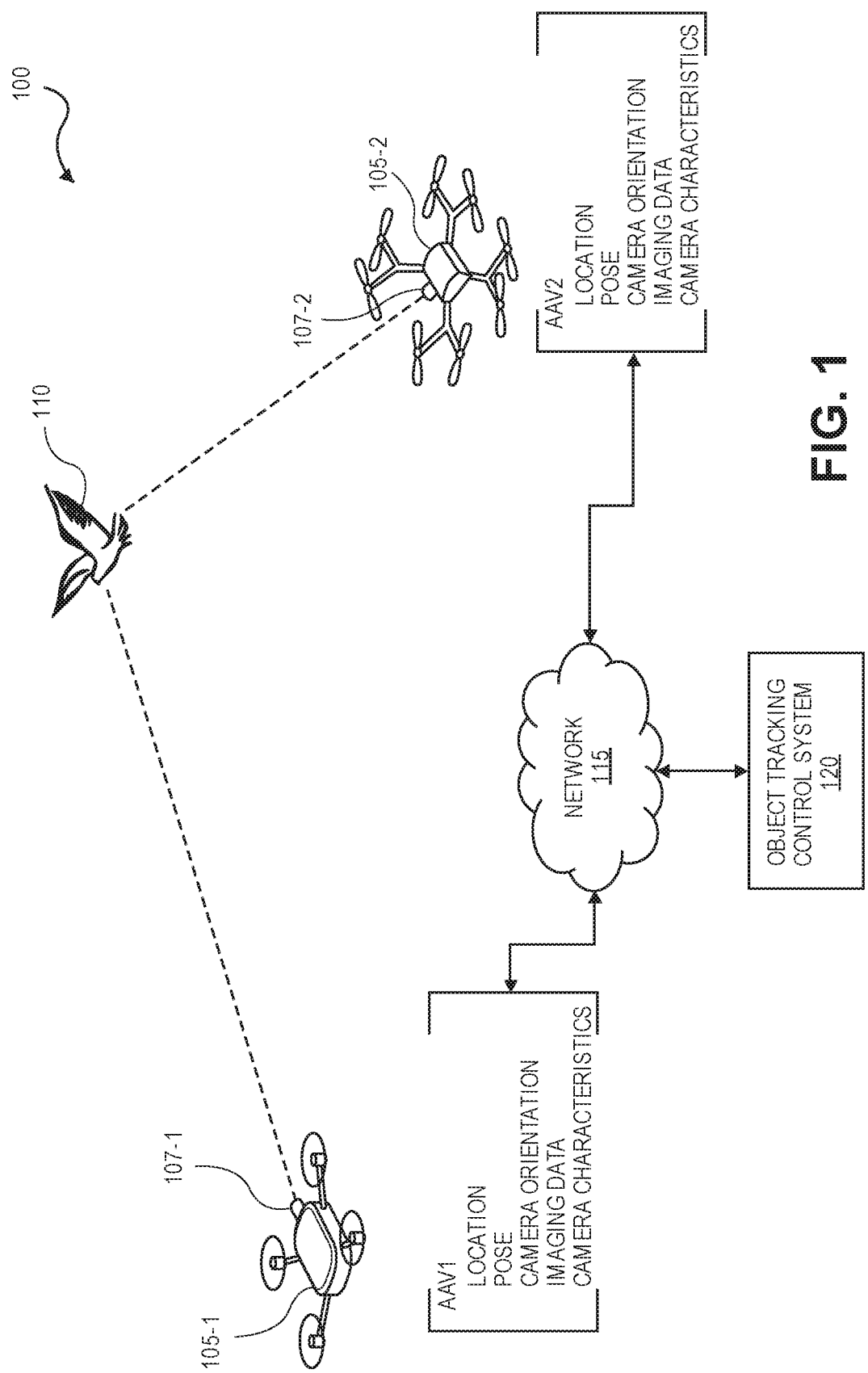
FIG. 1 is a schematic diagram of an example object tracking system, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods to track objects using imaging devices associated with aerial vehicles are described. The objects may be captured within imaging data using imaging devices of a plurality of aerial vehicles. Location and/or pose information associated with the plurality of aerial vehicles, optical axis information and/or imaging characteristics associated with the imaging devices, and/or image processing techniques may be used in order to determine locations and/or ranges of the objects within the imaging data relative to at least some of the plurality of aerial vehicles.

For example, the object tracking systems described herein may include a plurality of aerial vehicles and a control station. The plurality of aerial vehicles may be any type of aerial vehicle, e.g., unmanned or automated aerial vehicles such as quadcopters, hexacopters, octocopters, or other configurations. In addition, each of the plurality of aerial vehicles may include at least one imaging device, e.g., an analog camera, a digital camera, a high-resolution camera, or other types of imaging devices. Further, each of the plurality of aerial vehicles may include an imaging device controller to modify a pose or orientation of the imaging device, and may also include an image processing module to perform image processing on the imaging data.

The plurality of aerial vehicles may determine and/or provide location information using global positioning sensors and/or other location sensors. In addition, the plurality of aerial vehicles may determine and/or provide pose information using inertial measurement units, accelerometers, and/or gyroscopes. Further, the plurality of aerial vehicles may determine and/or provide optical axis information associated with their imaging devices using motor controllers and/or position encoders associated with the imaging devices, as well as imaging characteristics associated with the imaging devices.

Moreover, the control station may receive imaging data from the plurality of aerial vehicles, and/or any of the location, pose, and/or optical axis information from the plurality of aerial vehicles. In addition, the control station may include an image processing module to perform image processing on the imaging data to identify objects and determine directional or optical rays along which the objects were identified. The image processing may include determining pixel locations of objects within imaging data relative to optical axes associated with the imaging data. Further, the image processing may include determining directional or optical rays associated with the determined pixel locations of the objects based on imaging characteristics of the imaging devices.

Further, the control station may include a three-dimensional mapping module to generate a three-dimensional map of the determined directional or optical rays and identify any intersections, e.g., by applying triangulation processes or methods to the determined optical rays, associated with objects that were captured within imaging data of a plurality of aerial vehicles. Then, based on the identified intersections, the control station may determine locations and/or ranges of the identified objects relative to at least some of the plurality of aerial vehicles.

FIG. 1 is a schematic diagram of an example object tracking system 100, according to an implementation.

The example object tracking system 100 may include a plurality of aerial vehicles 105, in which each of the plurality of aerial vehicles includes one or more imaging devices 107 to capture imaging data of one or more objects 110. In addition, each of the plurality of aerial vehicles 105 may be in communication with an object tracking control system 120 via a network 115. Although FIG. 1 includes two aerial vehicles 105-1, 105-2 having imaging devices 107-1, 107-2 to capture images of an object 110, any other number, combination, or arrangement of aerial vehicles 105, imaging devices 107, objects 110, and/or control systems 120 may form part of the object tracking system 100.

As shown in FIG. 1, each aerial vehicle 105 may be any particular type or configuration of aerial vehicle. For example, aerial vehicle 105-1 is shown as a quadcopter, and aerial vehicle 105-2 is shown as an octocopter. In addition, the aerial vehicles 105 may be unmanned or automated aerial vehicles (AAVs). Other types or configurations of aerial vehicles may also be included in the object tracking system 100.

In addition, each aerial vehicle 105 may include one or more imaging devices 107. For example, the imaging devices 107 may include analog cameras, digital cameras, video cameras, imaging sensors, infrared imaging devices, or other imaging devices. The imaging devices 107 may capture imaging data in any frequency or wavelength of light, such as human-visible light, ultraviolet light, infrared light, or other frequencies or wavelengths.

Further, each aerial vehicle may determine and/or provide information related to the aerial vehicle location, aerial vehicle pose or orientation, imaging device pose or orientation from which optical axes of one or more imaging devices may be determined, imaging data from one or more imaging devices, and/or characteristics associated with the one or more imaging devices. All or a portion of this information may be provided to the object tracking control system 120 via the network 115.

The network 115 may be any communication network via which the plurality of aerial vehicles 105 may communicate with the object tracking control system 120. For example, the network 115 may include wireless or wired networks, and may include WiFi networks, LAN (local area networks), WAN (wide area networks), cellular communication networks, satellite communication networks, the Internet, or other networks.

The object tracking control system 120 may process the information received from the plurality of aerial vehicles 105 to determine locations and/or ranges of objects 110 relative to at least some of the plurality of aerial vehicles 105. For example, the object tracking control system 120 may perform image processing on the received imaging data to identify objects 110, determine pixel locations of the objects 110 within the imaging data relative to optical axes associated with the imaging devices 107, and determine directional or optical rays that are associated with the pixel locations of the objects 110 based at least in part on characteristics of the imaging devices 107.

Alternatively, all or a portion of the image processing may be performed by individual aerial vehicles 105 prior to providing information to the object tracking control system 120 via the network 115. In embodiments in which all or a portion of the image processing is performed by individual aerial vehicles 105, imaging data from the one or more imaging devices and/or characteristics associated with the one or more imaging devices may not need to be provided to the object tracking control system 120. Further, in such embodiments, one or more outputs of the image processing, such as identified objects, determined pixel locations of the objects, and/or determined optical rays associated with the pixel locations may be provided by the individual aerial vehicles 105 to the object tracking control system 120.

Based at least in part on the determined optical rays associated with pixel locations of objects, and information related to aerial vehicle locations, aerial vehicle poses or orientations, and/or imaging device poses or orientations from which optical axes of one or more imaging devices may be determined, the object tracking control system 120 may generate a three-dimensional mapping of the determined optical rays and determine whether any two or more of the optical rays intersects with a threshold degree of confidence, e.g., by applying triangulation processes or methods to the determined optical rays. If two or more optical rays are determined to intersect, it may be determined that objects identified by two or more aerial vehicles associated with the two or more optical rays are actually the same object, and locations and/or ranges of the object relative to the two or more aerial vehicles may be determined.

Figure 2:
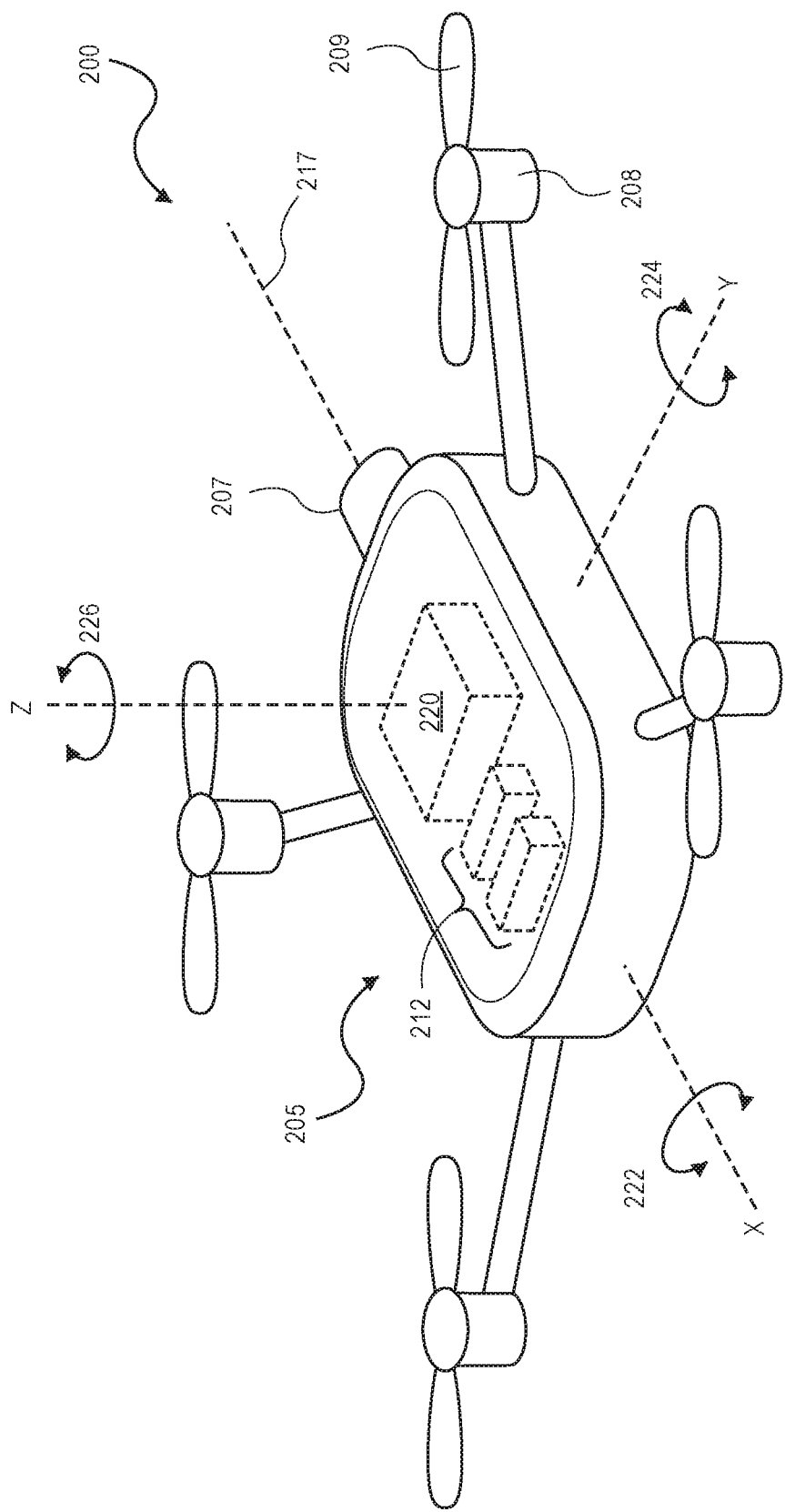
FIG. 2 is a schematic diagram of an example aerial vehicle having an imaging device, according to an implementation.

FIG. 2 is a schematic diagram 200 of an example aerial vehicle 205 having an imaging device 207, according to an implementation.

The aerial vehicle 205 may include a frame or body, one or more imaging devices 207 attached to the frame or body, a plurality of motors 208 and propellers 209 also attached to the frame or body, e.g., via motor arms, a plurality of power supplies 212, and an aerial vehicle control system 220. The frame or body may include any structure that supports the various components of the aerial vehicle 205, and may include a fuselage or central portion and a plurality of motor arms. Although FIG. 2 shows an aerial vehicle 205 having a quadcopter configuration, any other type or configuration of aerial vehicle may be used in the systems and methods described herein, e.g., a hexacopter, an octocopter, or other configuration.

The one or more imaging devices 207 may include analog cameras, digital cameras, video cameras, imaging sensors, infrared imaging devices, or other imaging devices. The imaging devices 207 may capture imaging data in any frequency or wavelength of light, such as human-visible light, ultraviolet light, infrared light, or other frequencies or wavelengths. In addition, the imaging devices 207 may be attached to the frame or body, e.g., to the fuselage or central portion or to motor arms. Further, the imaging devices 207 may have a fixed pose or orientation relative to the frame or body, or may have a variable or movable pose or orientation relative to the frame or body. For example, the pose or orientation may be defined by a direction of an optical axis 217 of an imaging device 207, in which the optical axis 217 extends along a central optical ray within the field of view of the imaging device 207, relative to the frame or body. Although FIG. 2 shows a single imaging device 207 attached to the fuselage of the aerial vehicle 205, any other number or arrangement of imaging devices 207 may be included in the aerial vehicles 205 as part of the systems and methods described herein.

The motors 208 and propellers 209 may be any motor and propeller combinations suitable to provide lift and/or maneuverability to the aerial vehicle 205. The motors 208 and propellers 209 may be attached to the frame or body, e.g., to the fuselage or central portion or to motor arms. In addition, other propulsion mechanisms may be used in place of or in combination with motors and propellers, such as fans, jets, turbojets, turbo fans, jet engines, electric jets, or others. Although FIG. 2 shows four motors 208 and propellers 209, any other number or arrangement of propulsion mechanisms may be included in the aerial vehicles 205 as part of the systems and methods described herein.

The power supplies 212 may provide power to various components of the aerial vehicle 205, including the motors 208 and propellers 209, the imaging devices 207, the aerial vehicle control system 220, and any other components. For example, the power supplies 212 may comprise batteries having electrochemical cells of various types, such as lithium ion (Li-ion, LiPo, LIP, Li-poly or others), nickel metal hydride (NiMH), or other cell types. Although FIG. 2 shows two power supplies 212, any other number or arrangement of power supplies 212 may be included in the aerial vehicles 205 as part of the systems and methods described herein.

Figure 8:
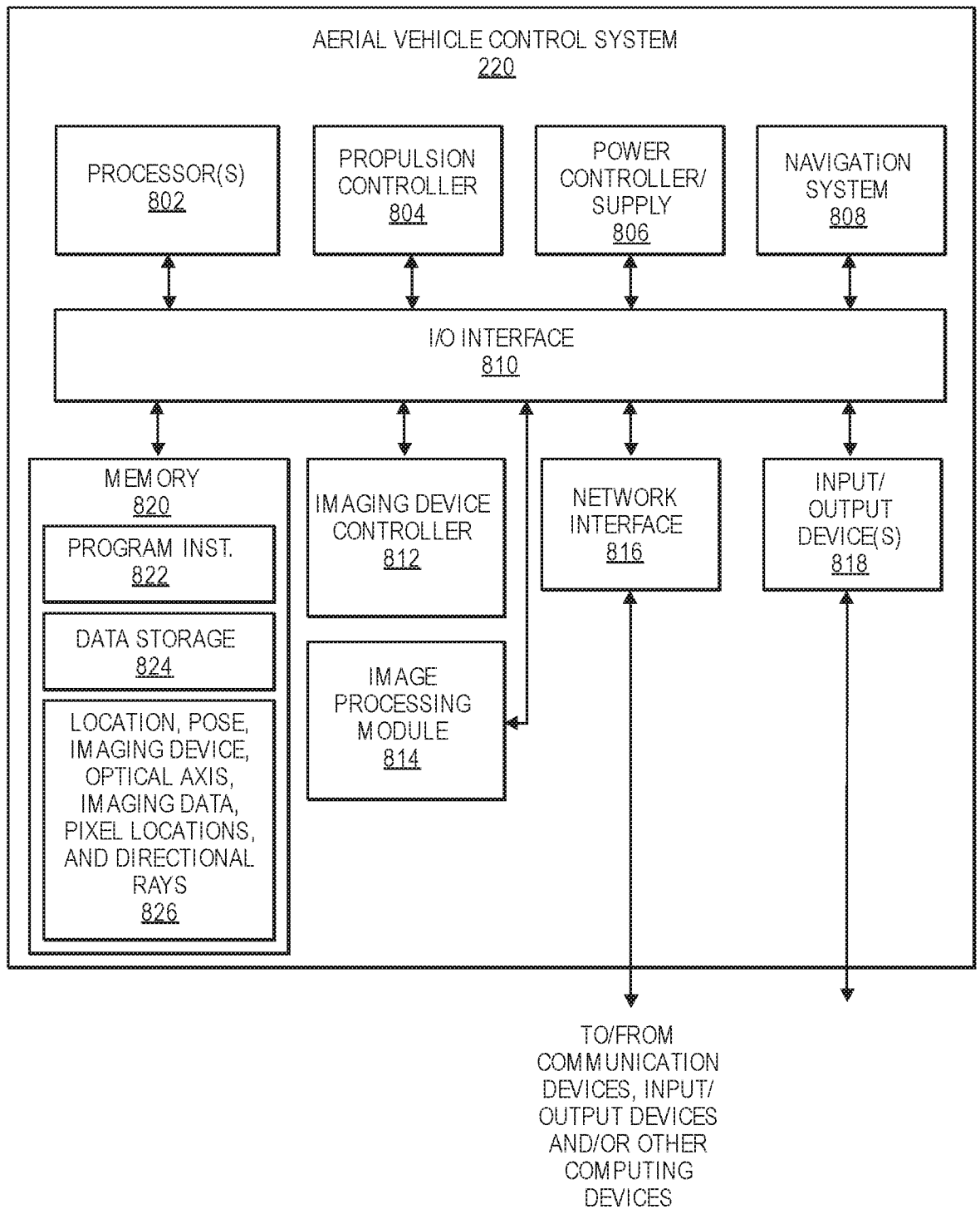
FIG. 8 is a block diagram illustrating various components of an aerial vehicle control system, according to an implementation.

The aerial vehicle control system 220, as further described herein with respect to FIG. 8, may control the operation of the various components of the aerial vehicle 205, including navigation, operation of one or more imaging devices 207, processing of imaging data captured by the one or more imaging devices 207, communication with other aerial vehicles 205, communication with a control station and/or an object tracking control system 120, and other operations. Moreover, the aerial vehicle control system 220 may receive instructions from the control station and/or the object tracking control system 120 and control navigation or operations of the aerial vehicle 205 based at least in part on the received instructions.

The aerial vehicle control system 220 may also include various sensors to aid navigation or other operations. For example, the aerial vehicle control system 220 may include location sensors, e.g., global positioning system (GPS) sensors, to determine a location of the aerial vehicle 205. Alternatively or in addition, other types of location sensors may also be included in the aerial vehicle 205, such as local positioning system sensors, altimeters, barometers, or other sensors. The location sensors may provide location information of the aerial vehicle 205 in terms of latitude, longitude, and altitude coordinates relative to the Earth, or other local coordinate systems.

In addition, the aerial vehicle control system 220 may include pose or orientation sensors to determine a pose or orientation of the aerial vehicle 205. For example, the pose or orientation sensors may include inertial measurement units, accelerometers, gyroscopes, or other sensors. Based at least in part on information from the pose or orientation sensors, roll 222, pitch 224, and/or yaw 226 of the aerial vehicle 205, e.g., relative to the Earth, may be determined.

Although FIG. 2 shows particular numbers and arrangements of components included in the aerial vehicle 205, any other numbers and arrangements of components may be included in the aerial vehicles 205 as part of the systems and methods described herein. Further, the aerial vehicle 205 may include other components not particularly shown or described, such as various other sensors to aid navigation or other operations, and/or actuators or motors associated with imaging devices to change fields of view and optical axes of the imaging devices.

Figure 3:
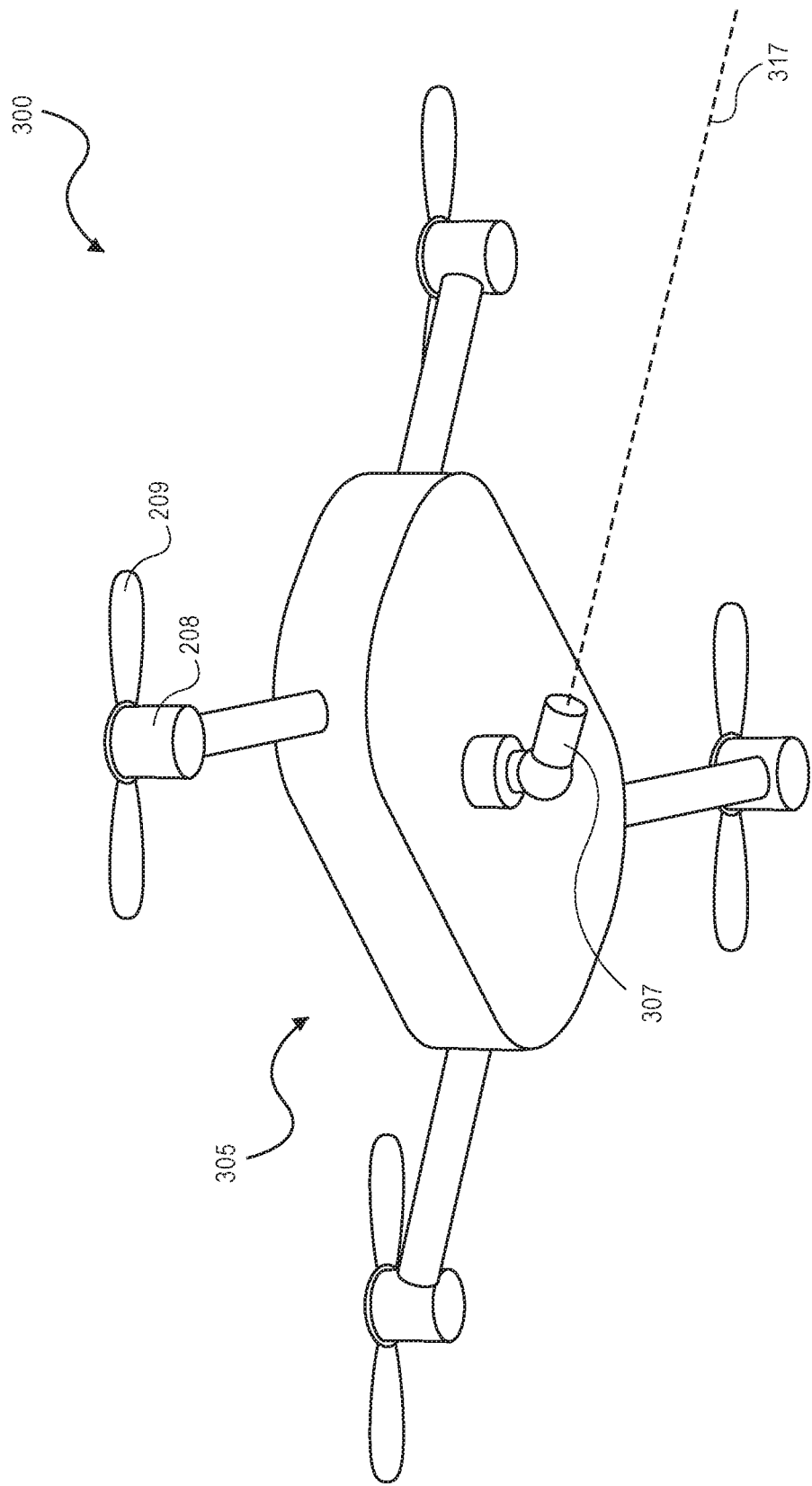
FIG. 3 is a schematic diagram of another example aerial vehicle having an imaging device, according to an implementation.

FIG. 3 is a schematic diagram 300 of another example aerial vehicle 305 having an imaging device 307, according to an implementation.

The aerial vehicle 305 may include the same or similar components as described herein with respect to the aerial vehicle 205. For example, the aerial vehicle 305 may include a frame or body, one or more imaging devices 307 attached to the frame or body, a plurality of motors 208 and propellers 209 also attached to the frame or body, e.g., via motor arms, a plurality of power supplies 212, and an aerial vehicle control system 220.

As shown in the FIG. 3, the imaging device 307 may be variably or movably attached to the frame or body. For example, the imaging device 307 may include one or more actuators or motors to change a field of view and an optical axis of the imaging device 307. The imaging device 307 may be attached to the frame or body of the aerial vehicle 305 via one or more arms, beams, rods, plates, discs, joints, gimbals, or other movable components such that the field of the view of the imaging device 307 may be selectively modified. In addition, the movable components may be moved via one or more actuators or motors, such as servos, solenoids, rotary actuators, linear actuators, pneumatic actuators, hydraulic actuators, or other actuators or motors.

Further, a position of the variable or movable imaging device 307 relative to the frame or body of the aerial vehicle 305 may be determined using one or more sensors. For example, motor controllers, position encoders, rotary encoders, or other sensors may receive and/or determine a current position of the variable or movable imaging device 307 relative to the frame or body of the aerial vehicle 305. Based at least in part on the determined current position of the variable or movable imaging device 307 relative to the frame or body of the aerial vehicle 305, an optical axis 317 of the current field of view of the imaging device 307 relative to the frame or body of the aerial vehicle 305 may be determined. For example, the optical axis 317 may be an optical ray that extends from a center point of the imaging device 307 to a center point of the current field of view of the imaging device 307.

Although FIG. 3 shows particular numbers and arrangements of components included in the aerial vehicle 305, any other numbers and arrangements of components may be included in the aerial vehicles 305 as part of the systems and methods described herein. Further, the aerial vehicle 305 may include other components not particularly shown or described, such as various other structures, motors, or actuators to change fields of view and optical axes of imaging devices, and/or various other sensors to determine current positions, fields of view, or optical axes of imaging devices.

Figure 4:
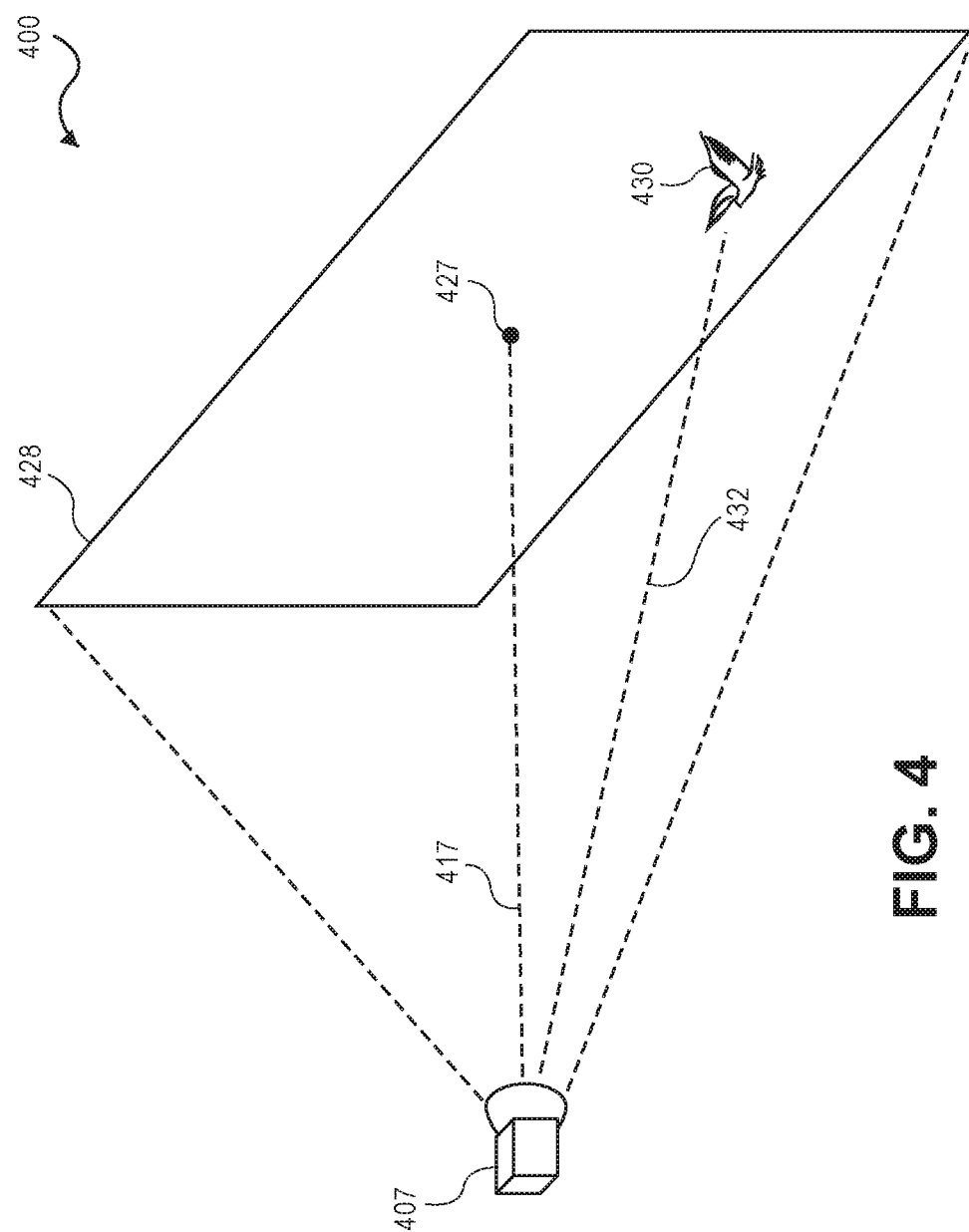
FIG. 4 is a schematic diagram of an example field of view of an imaging device, according to an implementation.

FIG. 4 is a schematic diagram 400 of an example field of view of an imaging device 407, according to an implementation.

As shown in FIG. 4, an imaging device 407, whether fixedly or movably attached to the frame or body of an aerial vehicle, may include a current field of view 428. The field of view 428 may be rectangular and may have an aspect ratio of 4:3 with a respective width or horizontal extent that is larger than a respective height or vertical extent. Alternatively, the field of view 428 may have any other shape or aspect ratio dependent upon imaging characteristics of the imaging device 407, e.g., shape, size, resolution, or other characteristics. For example, the field of view 428 may be square, circular, elliptical, or any other shape or size.

The imaging device 407 may also include an optical axis 417. For example, the optical axis 417 may be a central optical ray that extends from a center point of the imaging device 407 to a center point 427 of the current field of view 428 of the imaging device 407. In some embodiments, the optical axis 417 may extend from a center point of a lens of the imaging device 407 to the center point 427 of the current field of view 428. The optical axis 417 may be dependent upon imaging characteristics of one or more lenses of the imaging device 407, e.g., shape, size, curvature, focal length, or other characteristics.

As shown in FIG. 4, an object 430 may also be present within the current field of view 428 of the imaging device 407. For example, the object 430 may be a bird, other animal, an aerial vehicle, an airborne object, or any other object or structure. In addition, the object 430 may be present at one or more pixel locations within the current field of view 428 relative to the optical axis. Based at least in part on the one or more pixel locations of the object 430, a directional or optical ray 432 associated with the one or more pixel locations may be determined. The directional or optical ray 432 associated with the one or more pixel locations may be dependent upon imaging characteristics of the imaging device 407, e.g., shape, size, resolution, or other characteristics, and/or imaging characteristics of one or more lenses of the imaging device 407, e.g., shape, size, curvature, focal length, or other characteristics.

In example embodiments, the imaging device 407 and any associated lenses may have a particular imaging resolution. Each pixel location of the imaging device 407 may be associated with a particular optical ray that extends from the imaging device 407 to the pixel location. Given a higher imaging resolution of the imaging device 407, a captured image may include a higher number of pixel locations with an associated higher number of optical rays. Likewise, given a lower imaging resolution of the imaging device 407, a captured image may include a lower number of pixel locations with an associated lower number of optical rays.

Figures 5A, 5B:
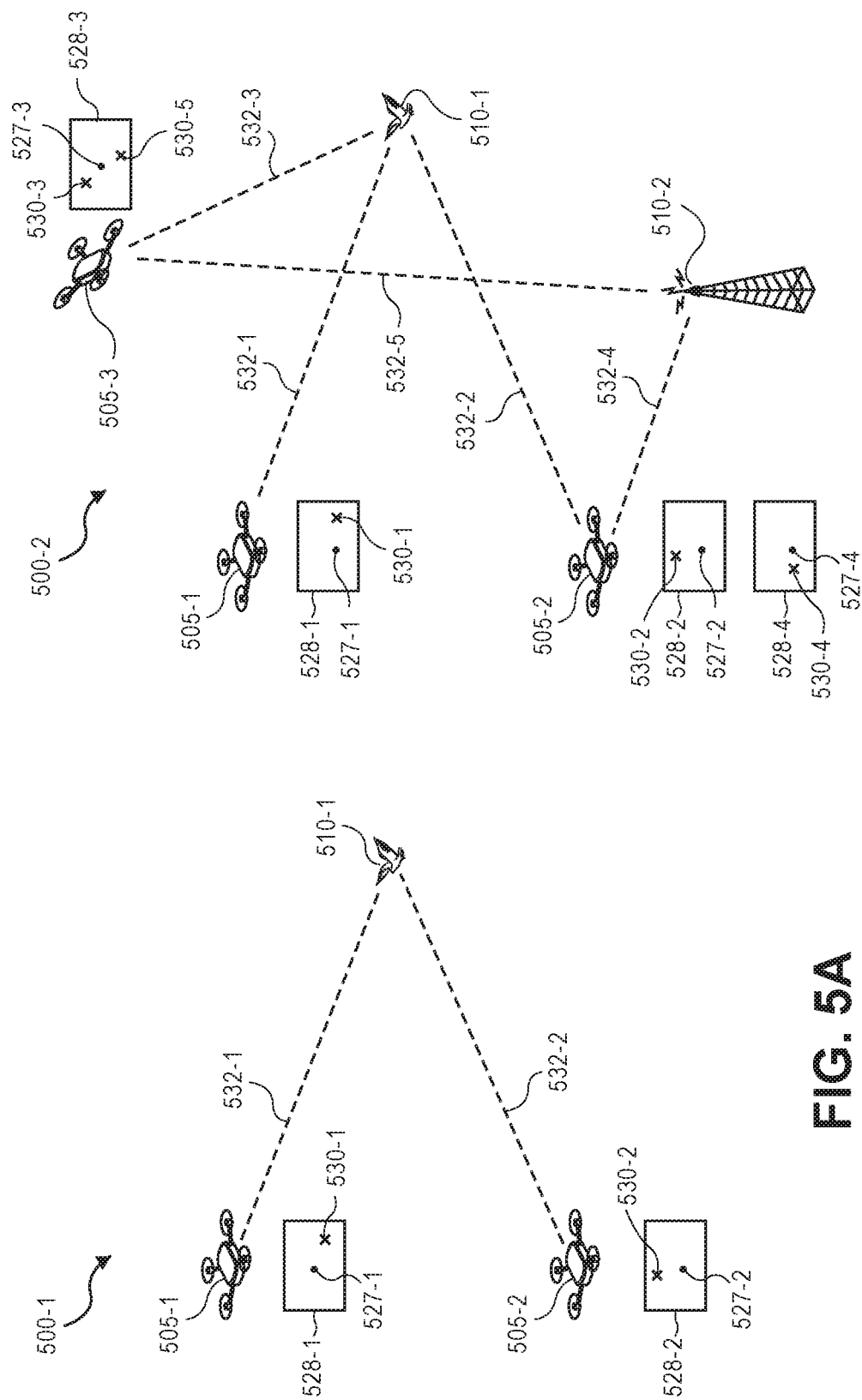
FIGS. 5A and 5B are schematic diagrams of example aerial vehicles as part of an object tracking system, according to an implementation.

FIGS. 5A and 5B are schematic diagrams 500-1, 500-2 of example aerial vehicles as part of an object tracking system, according to an implementation.

As shown in FIG. 5A, an aerial vehicle 505-1 and an aerial vehicle 505-2 may form part of an object tracking system, in combination with a control station or object tracking control system. The aerial vehicle 505-1 may be at a particular location with a particular pose or orientation, and an imaging device of the aerial vehicle 505-1 may have a current field of view 528-1, as schematically indicated in FIG. 5A. The imaging device of the aerial vehicle 505-1 may also include a center point 527-1 associated with an optical axis of the current field of view 528-1 of the imaging device. An image captured by the imaging device of the aerial vehicle 505-1 may include an object 510-1, e.g., a bird or other object, that is located at a pixel location 530-1 relative to the optical axis. In addition, based at least in part on the pixel location 530-1, an optical ray 532-1 associated with the pixel location 530-1 may be determined based on imaging characteristics of the imaging device and any associated lenses.

Further, as shown in FIG. 5A, the aerial vehicle 505-2 may be at a particular location with a particular pose or orientation, and an imaging device of the aerial vehicle 505-2 may have a current field of view 528-2, as schematically indicated in FIG. 5A. The imaging device of the aerial vehicle 505-2 may also include a center point 527-2 associated with an optical axis of the current field of view 528-2 of the imaging device. An image captured by the imaging device of the aerial vehicle 505-2 may also include the object 510-1, e.g., a bird or other object, that is located at a pixel location 530-2 relative to the optical axis. In addition, based at least in part on the pixel location 530-2, an optical ray 532-2 associated with the pixel location 530-2 may be determined based on imaging characteristics of the imaging device and any associated lenses.

As further described herein, the optical rays 532-1, 532-2 may be mapped in three-dimensional space based least in part on locations of the aerial vehicles 505-1, 505-2, poses of the aerial vehicles 505-1, 505-2, directions of optical axes of imaging devices of the aerial vehicles 505-1, 505-2, and/or pixel locations 530-1, 530-2 of objects identified in images captured by the imaging devices of the aerial vehicles 505-1, 505-2. If it is determined that the optical rays 532-1, 532-2 intersect in three-dimensional space with a threshold degree of confidence based at least in part on the three-dimensional mapping, then it may be determined that each of the aerial vehicles 505-1, 505-2 has captured an image of the same object 510-1. Then, a location and/or a range of the object 510-1 relative to one or more of the aerial vehicles 505-1, 505-2 may be determined based at least in part on the three-dimensional mapping.

Accordingly, although each aerial vehicle individually may not be able to determine a location and/or a range of an object relative to the aerial vehicle based on images captured by an imaging device associated with the individual aerial vehicle alone, the combination of imaging data from two or more aerial vehicles that includes images of the same object, in combination with additional information related to the aerial vehicles and the imaging devices, may allow a determination of a location and/or a range of the object relative to the two or more aerial vehicles.

As shown in FIG. 5B, an aerial vehicle 505-1, an aerial vehicle 505-2, and an aerial vehicle 505-3 may form part of an object tracking system, in combination with a control station or object tracking control system. The aerial vehicle 505-1 may be at a particular location with a particular pose or orientation, and an imaging device of the aerial vehicle 505-1 may have a current field of view 528-1, as schematically indicated in FIG. 5B. The imaging device of the aerial vehicle 505-1 may also include a center point 527-1 associated with an optical axis of the current field of view 528-1 of the imaging device. An image captured by the imaging device of the aerial vehicle 505-1 may include an object 510-1, e.g., a bird or other object, that is located at a pixel location 530-1 relative to the optical axis. In addition, based at least in part on the pixel location 530-1, an optical ray 532-1 associated with the pixel location 530-1 may be determined based on imaging characteristics of the imaging device and any associated lenses.

Further, as shown in FIG. 5B, the aerial vehicle 505-2 may be at a particular location with a particular pose or orientation, and a first imaging device of the aerial vehicle 505-2 may have a current field of view 528-2, as schematically indicated in FIG. 5B. The first imaging device of the aerial vehicle 505-2 may also include a center point 527-2 associated with an optical axis of the current field of view 528-2 of the first imaging device. An image captured by the first imaging device of the aerial vehicle 505-2 may also include the object 510-1, e.g., a bird or other object, that is located at a pixel location 530-2 relative to the optical axis. In addition, based at least in part on the pixel location 530-2, an optical ray 532-2 associated with the pixel location 530-2 may be determined based on imaging characteristics of the first imaging device and any associated lenses.

Moreover, as shown in FIG. 5B, the aerial vehicle 505-3 may be at a particular location with a particular pose or orientation, and an imaging device of the aerial vehicle 505-3 may have a current field of view 528-3, as schematically indicated in FIG. 5B. The imaging device of the aerial vehicle 505-3 may also include a center point 527-3 associated with an optical axis of the current field of view 528-3 of the imaging device. An image captured by the imaging device of the aerial vehicle 505-3 may also include the object 510-1, e.g., a bird or other object, that is located at a pixel location 530-3 relative to the optical axis. In addition, based at least in part on the pixel location 530-3, an optical ray 532-3 associated with the pixel location 530-3 may be determined based on imaging characteristics of the imaging device and any associated lenses.

As further described herein, the optical rays 532-1, 532-2, 532-3 may be mapped in three-dimensional space based least in part on locations of the aerial vehicles 505-1, 505-2, 505-3, poses of the aerial vehicles 505-1, 505-2, 505-3, directions of optical axes of imaging devices of the aerial vehicles 505-1, 505-2, 505-3, and/or pixel locations 530-1, 530-2, 530-3 of objects identified in images captured by the imaging devices of the aerial vehicles 505-1, 505-2, 505-3. If it is determined that the optical rays 532-1, 532-2, 532-3 intersect in three-dimensional space with a threshold degree of confidence based at least in part on the three-dimensional mapping, then it may be determined that each of the aerial vehicles 505-1, 505-2, 505-3 has captured an image of the same object 510-1. Then, a location and/or a range of the object 510-1 relative to one or more of the aerial vehicles 505-1, 505-2, 505-3 may be determined based at least in part on the three-dimensional mapping.

In addition, as shown in FIG. 5B, the aerial vehicle 505-2 may be at a particular location with a particular pose or orientation, and a second imaging device of the aerial vehicle 505-2 may have a current field of view 528-4, as schematically indicated in FIG. 5B. The second imaging device of the aerial vehicle 505-2 may also include a center point 527-4 associated with an optical axis of the current field of view 528-4 of the second imaging device. An image captured by the second imaging device of the aerial vehicle 505-2 may include an object 510-2, e.g., a tower or other object, that is located at a pixel location 530-4 relative to the optical axis. In addition, based at least in part on the pixel location 530-4, an optical ray 532-4 associated with the pixel location 530-4 may be determined based on imaging characteristics of the second imaging device and any associated lenses.

Further, as shown in FIG. 5B, the aerial vehicle 505-3 may be at a particular location with a particular pose or orientation, and the imaging device of the aerial vehicle 505-3 may have a current field of view 528-3, as schematically indicated in FIG. 5B. The imaging device of the aerial vehicle 505-3 may also include a center point 527-3 associated with an optical axis of the current field of view 528-3 of the imaging device. An image captured by the imaging device of the aerial vehicle 505-3 may also include the object 510-2, e.g., the tower or other object, that is located at a pixel location 530-5 relative to the optical axis. In addition, based at least in part on the pixel location 530-5, an optical ray 532-5 associated with the pixel location 530-5 may be determined based on imaging characteristics of the imaging device and any associated lenses.

As further described herein, the optical rays 532-4, 532-5 may be mapped in three-dimensional space based at least in part on locations of the aerial vehicles 505-2, 505-3, poses of the aerial vehicles 505-2, 505-3, directions of optical axes of imaging devices of the aerial vehicles 505-2, 505-3, and/or pixel locations 530-4, 530-5 of objects identified in images captured by the imaging devices of the aerial vehicles 505-2, 505-3. If it is determined that the optical rays 532-4, 532-5 intersect in three-dimensional space with a threshold degree of confidence based at least in part on the three-dimensional mapping, then it may be determined that each of the aerial vehicles 505-2, 505-3 has captured an image of the same object 510-2. Then, a location and/or a range of the object 510-2 relative to one or more of the aerial vehicles 505-1, 505-2, 505-3 may be determined based at least in part on the three-dimensional mapping.

Further, as shown in FIG. 5B, an individual aerial vehicle, e.g., aerial vehicle 505-2, may include a plurality of imaging devices with different or partially overlapping fields of view to capture images of objects and determine locations and/or ranges of the objects relative to one or more aerial vehicles. In addition, an individual aerial vehicle, e.g., aerial vehicle 505-3, may capture representations of a plurality of objects within a single image and determine locations and/or ranges of the objects relative to one or more aerial vehicles.

Accordingly, although each aerial vehicle individually may not be able to determine a location and/or a range of an object relative to the aerial vehicle based on images captured by an imaging device associated with the individual aerial vehicle alone, the combination of imaging data from two or more aerial vehicles that includes images of the same object, in combination with additional information related to the aerial vehicles and the imaging devices, may allow a determination of a location and/or a range of the object relative to the two or more aerial vehicles.

Moreover, using the systems and methods described herein, locations and/or ranges of particular objects relative to one or more aerial vehicles that have not captured any images of the particular objects may also be determined based at least in part on the three-dimensional mapping. For example, as shown in FIG. 5B, based at least in part on the captured images from imaging devices of aerial vehicles 505-2, 505-3 that include representations of the object 510-2, a location and/or a range of the object 510-2 relative to aerial vehicle 505-1 may also be determined, even in the absence of any imaging data captured by the imaging device of aerial vehicle 505-1 that includes the object 510-2, based at least in part on the three-dimensional mapping of the optical rays 532-4, 532-5 and location and/or pose information associated with the aerial vehicles 505-1, 505-2, 505-3 and their respective imaging devices.

Figure 6:
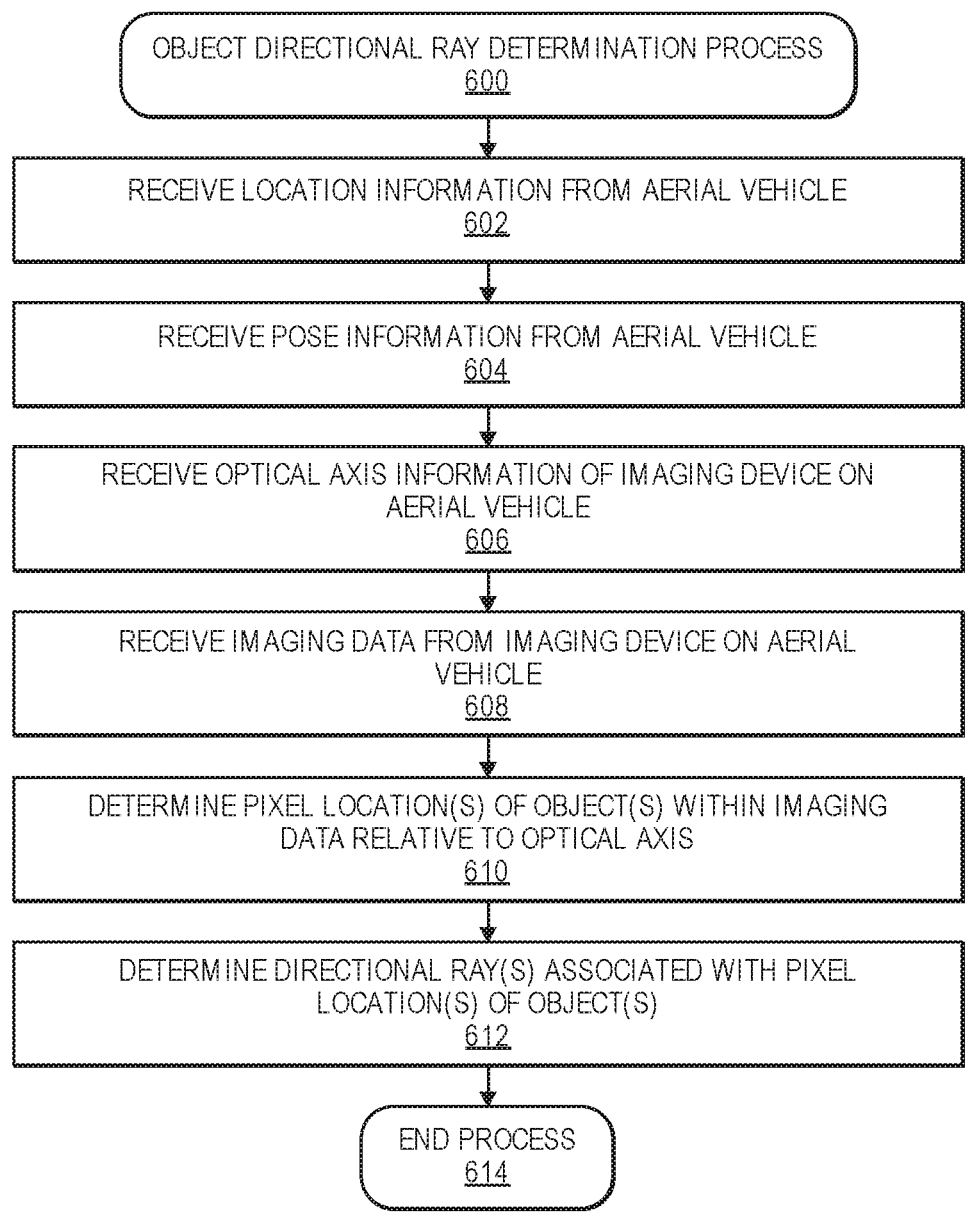
FIG. 6 is a flow diagram illustrating an example object directional ray determination process, according to an implementation.

FIG. 6 is a flow diagram illustrating an example object directional ray determination process 600, according to an implementation.

The process 600 may begin by receiving location information associated with an aerial vehicle, as at 602. For example, the location information may be received from and/or determined by various sensors of the aerial vehicle, such as GPS sensors, local positioning system sensors, barometers, altimeters, or other sensors. The location information may include latitude, longitude, and/or altitude coordinates relative to the Earth, or other local coordinate systems.

The process 600 may then proceed by receiving pose information associated with the aerial vehicle, as at 604. For example, the pose information may be received from and/or determined by various sensors of the aerial vehicle, such as inertial measurement units, accelerometers, gyroscopes, or other sensors. The pose information may include roll, pitch, and/or yaw information of the aerial vehicle relative to the Earth.

The process 600 may then continue to receive optical axis information of an imaging device on the aerial vehicle, as at 606. For example, a pose or orientation of the imaging device relative to a frame or body of the aerial vehicle may be received. If the imaging device is fixedly attached to the frame or body of the aerial vehicle, then the pose of the imaging device may also be fixed, such that the optical axis of the imaging device is also fixed. Alternatively, if the imaging device is movable relative to the frame or body of the aerial vehicle, the pose of the imaging device may be received from and/or determined by various sensors of the aerial vehicle, such as motor controllers, position encoders, rotary encoders, or other sensors. The optical axis of the movable imaging device may be determined based at least in part on the current pose of the imaging device, in which the optical axis may be an optical ray that extends from a center point of the imaging device to a center point of the current field of view of the imaging device.

The process 600 may then proceed to receive imaging data from the imaging device on the aerial vehicle, as at 608. For example, the imaging data may include one or more still images or video, and may be received from and/or captured by various types of imaging devices, such as analog cameras, digital cameras, video cameras, imaging sensors, infrared imaging devices, or other imaging devices.

The process 600 may then proceed to perform image processing on the imaging data to determine a pixel location of an object within the imaging data relative to the optical axis of the imaging device, as at 610. For example, the object within the imaging data may be identified using any image recognition methods or algorithms, such as edge recognition, object recognition, or other similar algorithms. For the systems and methods described herein, it may not be necessary to identify any particular object, e.g., to identify an object as a bird or a tower. Instead, it may be sufficient to identify that an object of some unidentified type is present within the imaging data. Then, a pixel location of the object within the imaging data relative to the optical axis may be identified, which may be dependent upon imaging characteristics of the imaging device, e.g., shape, size, resolution, or other characteristics.

The process 600 may then continue to determine a directional or optical ray associated with the pixel location of the object, as at 612. For example, dependent upon imaging characteristics of the imaging device and/or any associated lenses, e.g., shape, size, curvature, focal length, or other characteristics, a particular optical ray associated with the pixel location of the object may be determined.

Based at least in part on the location, pose, and/or optical axis information associated with the aerial vehicle, the particular optical ray associated with the pixel location of the object may be specifically oriented in three-dimensional space. For example, by starting with the location of the aerial vehicle, then taking into account the pose of the aerial vehicle and the direction of the optical axis of the imaging device relative to the frame or body of the aerial vehicle, and then further taking into account the pixel location of the object relative to the optical axis of the imaging device, the particular optical ray associated with the pixel location of the object may have a specific orientation in three-dimensional space with a starting point proximate the location of the aerial vehicle and extending into three-dimensional space along the particular optical ray.

In some embodiments, an object may be associated with a plurality of pixel locations clustered relatively close together, e.g., if the resolution of the imaging device is relatively high, if the object is relatively close to the imaging device, and/or if the object is relatively large in size. In such embodiments, a plurality of optical rays associated with the plurality of pixel locations of the object may be determined as corresponding to the object. The process 600 may then end, as at 614.

Although FIG. 6 is generally described in terms of process steps that may be performed by a control station or object tracking control system 120, all or portions of the process steps of FIG. 6 may be performed by one or more of the aerial vehicles. For example, if an aerial vehicle control system of an aerial vehicle includes an image processing module to perform image processing on imaging data captured by an imaging device associated with the aerial vehicle, then all or portions of process steps 610 and/or 612 may be performed by the aerial vehicle control system using location, pose, and/or optical axis information of the aerial vehicle, and imaging data from the imaging device. In such embodiments, none or only a portion of the location, pose, and/or optical axis information, and/or imaging data may need to be provided to a control station for further processing and three-dimensional mapping of the determined optical rays. In other embodiments, the process steps of FIG. 6 may be performed by one or more aerial vehicles and one or more control stations in various other combinations.

Figure 7:
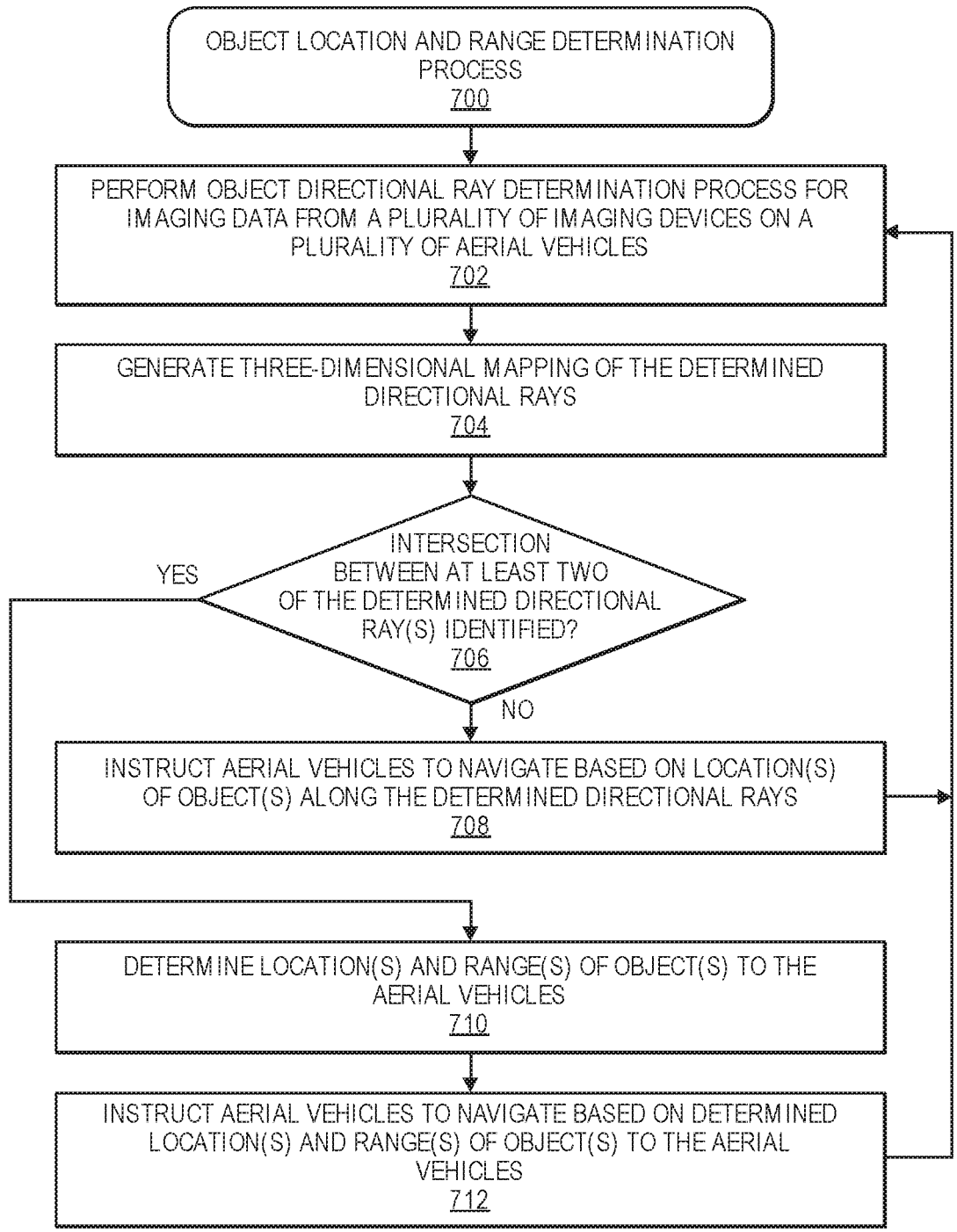
FIG. 7 is a flow diagram illustrating an example object location and range determination process, according to an implementation.

FIG. 7 is a flow diagram illustrating an example object location and range determination process 700, according to an implementation.

The process 700 may begin by performing the object directional ray determination process, as described with respect to FIG. 6, for imaging data from a plurality of imaging devices on a plurality of aerial vehicles, as at 702. For example, first imaging data may be received from a first imaging device associated with a first aerial vehicle, and second imaging data may also be received from a second imaging device associated with a second aerial vehicle. The object directional ray determination process 600 may be performed for each of the first imaging data and second imaging data to determine optical rays associated with objects identified in each set of imaging data.

The process 700 may continue by generating a three-dimensional mapping of the determined optical rays, as at 704. For example, the three-dimensional mapping may be generated by a three-dimensional mapping module of a control station or object tracking control system 120 using the location, pose, and/or optical axis information from the aerial vehicles, as well as the determined optical rays associated with pixel locations of objects, which are determined at least in part by an image processing module. Then, the three-dimensional mapping module may calculate, process, and/or build a three-dimensional rendering or representation of a space including the determined optical rays. The optical rays may begin proximate locations of the aerial vehicles in three-dimensional space and extend along the determined optical rays into three-dimensional space.

The process 700 may then proceed to determine whether an intersection between at least two of the determined optical rays has been identified, as at 706. For example, the three-dimensional mapping module of a control station or object tracking control system 120 may determine whether at least two optical rays that have been calculated, processed, and/or built into a three-dimensional rendering or representation of a space intersect with a threshold degree of confidence, e.g., by applying triangulation processes or methods to the optical rays.

The threshold degree of confidence may be determined based on various factors, such as absolute distance, relative distance, image resolution, other factors, or combinations thereof. For example, a threshold degree of confidence based at least in part on an absolute distance may determine that two optical rays intersect if the minimum distance between the two optical rays is less than a defined absolute distance, e.g., 2 meters, 1 meter, 0.5 meter, or other absolute distance. In some embodiments, a threshold degree of confidence based at least in part on a relative distance may determine that two optical rays intersect based on relative minimum distances between two optical rays versus other optical rays, e.g., two optical rays having a minimum distance therebetween that is smaller than a minimum distance between any other two optical rays. In other embodiments, a threshold degree of confidence based at least in part on a relative distance may determine that two optical rays intersect based on a minimum distance between the two optical rays at a potential point of intersection relative to distances between starting points of the two optical rays and the potential point of intersection. In still other embodiments, a threshold degree of confidence based at least in part on image resolution may determine that two optical rays intersect based on resolutions of imaging data within which objects were identified at particular pixel locations, such that imaging data having lower resolution may require two optical rays to have a smaller minimum distance therebetween than two optical rays determined from imaging data having higher resolution. Other factors that may influence the threshold degree of confidence related to determining intersections between at least two optical rays may relate to accuracy or precision of location information, pose information, and/or optical axis information, as well as other factors.

If it is determined at 706 that at least two optical rays do not intersect with a threshold degree of confidence, then the process 700 may instruct aerial vehicles to navigate based on potential locations of objects along the determined optical rays, as at 708. For example, because no intersections between optical rays have been identified, each identified object may be present at any point along the identified optical rays, such that the aerial vehicles may be instructed to avoid potential conflicts with the identified optical rays in the absence of further information or imaging data. The process 700 may then return to 702 to repeat the process with any new or additional information or imaging data.

If, however, it is determined at 706 that at least two optical rays do intersect with a threshold degree of confidence, then the process 700 may determine locations and/or ranges of objects associated with the at least two optical rays relative to one or more of the aerial vehicles, as at 710. For example, the three-dimensional mapping module may determine locations and/or ranges of the objects based at least in part on the generated three-dimensional mapping, using the location, pose, and/or optical axis information from the aerial vehicles, as well as the determined optical rays.

Then, the process 700 may instruct aerial vehicles to navigate based on the determined locations and/or ranges of objects associated with the at least two optical rays relative to one or more of the aerial vehicles. For example, because an intersection between optical rays has been identified, each identified object may be present at a particular location in three-dimensional space and/or at a particular range from an aerial vehicle in three-dimensional space along the identified optical rays, such that the aerial vehicles may be instructed to avoid potential conflicts with the determined locations and/or ranges of the objects. The process 700 may then return to 702 to repeat the process with any new or additional information or imaging data.

FIG. 8 is a block diagram illustrating various components of an aerial vehicle control system 220, according to an implementation. In various examples, the block diagram may be illustrative of one or more aspects of the aerial vehicle control system 220 that may be used to implement the various systems and processes discussed above. In the illustrated implementation, the aerial vehicle control system 220 includes one or more processors 802, coupled to a non-transitory computer readable storage medium 820 via an input/output (I/O) interface 810. The aerial vehicle control system 220 may also include a propulsion controller 804, a power controller/supply module 806 and/or a navigation system 808. The aerial vehicle control system 220 may further include an imaging device controller 812, an image processing module 814, a network interface 816, and one or more input/output devices 818.

In various implementations, the aerial vehicle control system 220 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, data, location information, pose information, imaging device information and characteristics, optical axis information, imaging data, pixel locations, directional or optical rays, and/or other data items accessible by the processor(s) 802. In various implementations, the non-transitory computer readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 820 as program instructions 822, data storage 824 and other information and data 826, respectively. In other implementations, program instructions, data and/or other information and data may be received, sent or stored upon different types of computer-accessible media, such as non-transitory media, or on similar media separate from the non-transitory computer readable storage medium 820 or the aerial vehicle control system 220.

Generally speaking, a non-transitory, computer readable storage medium may include storage media or memory media such as magnetic or optical media, e.g., disk or CD/DVD-ROM, coupled to the aerial vehicle control system 220 via the I/O interface 810. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 816.

In one implementation, the I/O interface 810 may be configured to coordinate I/O traffic between the processor(s) 802, the non-transitory computer readable storage medium 820, and any peripheral devices, the network interface 816 or other peripheral interfaces, such as input/output devices 818. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The propulsion controller 804 may communicate with the navigation system 808 and may adjust the operational characteristics of each propulsion mechanism to guide the aerial vehicle along a determined path and/or to perform other navigational maneuvers. The power controller/supply 806 may include one or more power supplies, e.g., batteries, and may control the provision of power to various components of the aerial vehicle and the aerial vehicle control system 220. The navigation system 808 may include GPS sensors, other location sensors, inertial measurement units, accelerometers, gyroscopes, and/or other sensors than can be used to navigate the aerial vehicle to and/or from a location.

The imaging device controller 812 may communicate with one or more imaging devices included on the aerial vehicle, and may control operation and/or movement of the imaging devices. The image processing module 814 may communicate with the imaging device controller 812 and/or the one or more imaging devices, and may perform processing of the imaging data from the imaging devices, such as identifying objects within the imaging data, determining pixel locations of objects relative to optical axes of the imaging devices, and/or determining optical rays associated with the determined pixel locations.

The network interface 816 may be configured to allow data to be exchanged between the aerial vehicle control system 220, other devices attached to a network, such as other computer systems, aerial vehicle control systems of other aerial vehicles, control stations and/or object tracking control systems 120. For example, the network interface 816 may enable wireless communication between numerous aerial vehicles, control stations, and/or object tracking control systems 120. In various implementations, the network interface 816 may support communication via wireless general data networks, such as a Wi-Fi network. For example, the network interface 816 may support communication via telecommunications networks such as cellular communication networks, satellite networks, and the like.

Input/output devices 818 may, in some implementations, include one or more visual output devices, audio input/output devices, input devices such as touchscreens, keyboards, or mice, image capture devices, thermal sensors, infrared sensors, time of flight sensors, location sensors, accelerometers, pressure sensors, weather sensors, other sensors described herein, etc. Multiple input/output devices 818 may be present and controlled by the aerial vehicle control system 220.

As shown in FIG. 8, the memory may include program instructions 822 which may be configured to implement the example processes and/or sub-processes described above. The data storage 824 and other information and data 826 may include various data stores for maintaining data items that may be provided for determining locations and/or poses of aerial vehicles, determining optical axes of imaging devices, processing imaging data, determining pixel locations of objects relative to optical axes, determining directional or optical rays associated with pixel locations of objects, and any other functions, operations, or processes described herein.

Figure 9:
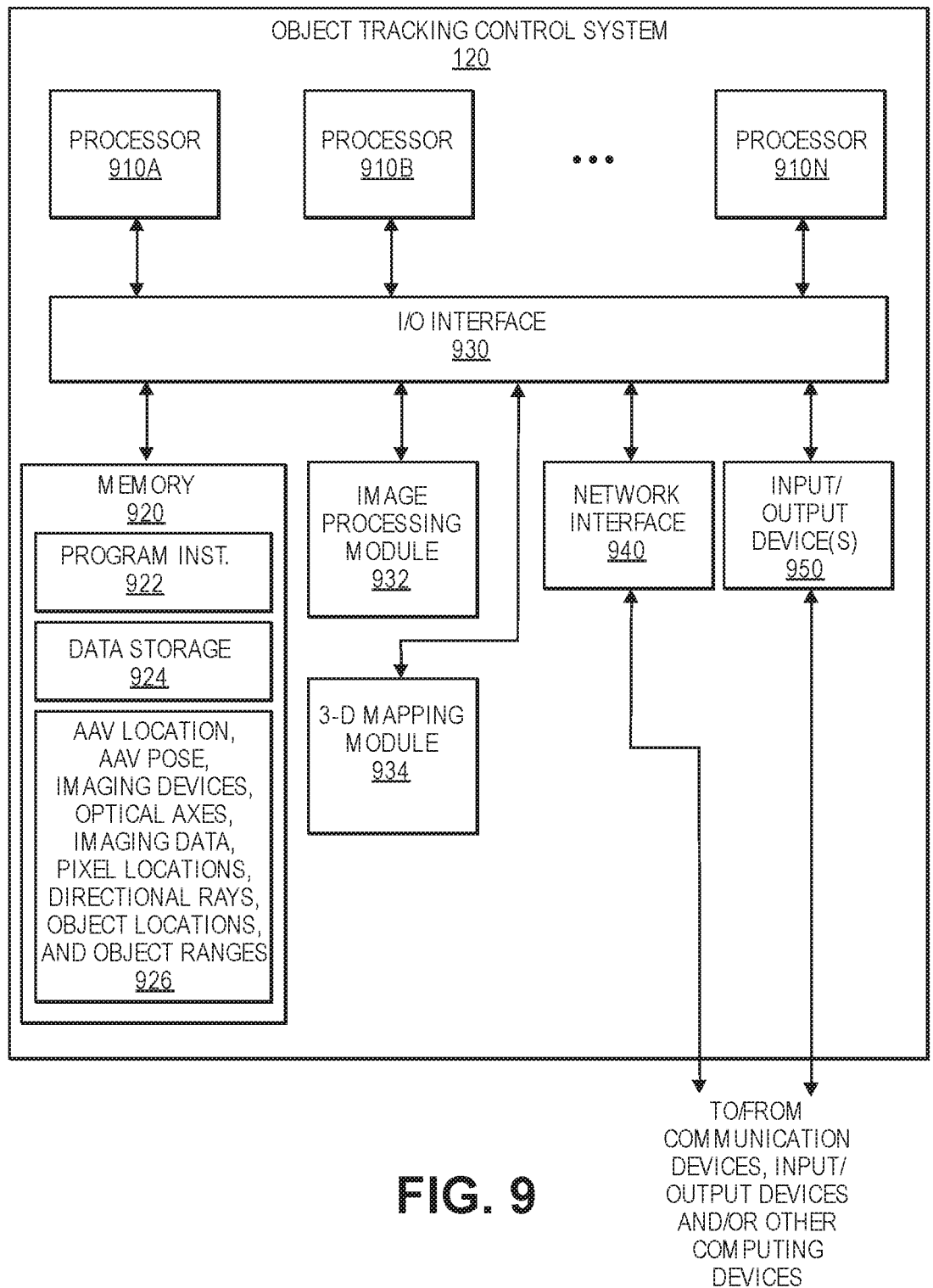
FIG. 9 is a block diagram illustrating various components of an object tracking control system, according to an implementation.

FIG. 9 is a block diagram illustrating various components of an object tracking control system 120, according to an implementation. In various examples, the block diagram may be illustrative of one or more aspects of the object tracking control system 120 that may be used to implement the various systems and processes discussed above. In the illustrated implementation, the object tracking control system 120 includes one or more processors 910, coupled to a non-transitory computer readable storage medium 920 via an input/output (I/O) interface 930. The object tracking control system 120 may also include an imaging processing module 932, a 3-D mapping module 934, a network interface 940, and one or more input/output devices 950.

The object tracking control system 120 may be included as part of a control station, and the control station may form a part of the object tracking system 100, in combination with a plurality of aerial vehicles. In some embodiments, the control station may be a fixed building, structure, or installation. In other embodiments, the control station may be mobile, and may comprise a ground-based vehicle, air-based vehicle, a water-based vehicle, or other mobile structure or installation. In still other embodiments, one or more of the plurality of aerial vehicles may include all or a portion of the components described herein with respect to the object tracking control system 120, such that all or a portion of the operations of the object tracking control system 120 may be performed by one or more aerial vehicles and/or may be distributed among a plurality of aerial vehicles in various combinations.

In various implementations, the object tracking control system 120 may be a uniprocessor system including one processor 910, or a multiprocessor system including several processors 910A-910N (e.g., two, four, eight, or another suitable number). The processor(s) 910 may be any suitable processor capable of executing instructions. For example, in various implementations, the processor(s) 910 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 910 may commonly, but not necessarily, implement the same ISA.

The non-transitory computer readable storage medium 920 may be configured to store executable instructions, data, aerial vehicle location information, aerial vehicle pose information, imaging device information and characteristics, optical axis information, imaging data, pixel locations, directional or optical rays, object locations, object ranges, and/or other data items accessible by the processor(s) 910. In various implementations, the non-transitory computer readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 920 as program instructions 922, data storage 924 and other information and data 926, respectively. In other implementations, program instructions, data and/or other information and data may be received, sent or stored upon different types of computer-accessible media, such as non-transitory media, or on similar media separate from the non-transitory computer readable storage medium 920 or the object tracking control system 120.

Generally speaking, a non-transitory, computer readable storage medium may include storage media or memory media such as magnetic or optical media, e.g., disk or CD/DVD-ROM, coupled to the object tracking control system 120 via the I/O interface 930. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 940.

In one implementation, the I/O interface 930 may be configured to coordinate I/O traffic between the processor(s) 910, the non-transitory computer readable storage medium 920, and any peripheral devices, the network interface 940 or other peripheral interfaces, such as input/output devices 950. In some implementations, the I/O interface 930 may perform any necessary protocol, timing or other data transformations to convert data signals from one component (e.g., non-transitory computer readable storage medium 920) into a format suitable for use by another component (e.g., processor(s) 910). In some implementations, the I/O interface 930 may include support for devices attached through various types of peripheral buses, such as a variant of the Peripheral Component Interconnect (PCI) bus standard or the Universal Serial Bus (USB) standard, for example. In some implementations, the function of the I/O interface 930 may be split into two or more separate components, such as a north bridge and a south bridge, for example. Also, in some implementations, some or all of the functionality of the I/O interface 930, such as an interface to the non-transitory computer readable storage medium 920, may be incorporated directly into the processor(s) 910.

The image processing module 932 may perform processing of the imaging data from the imaging devices of aerial vehicles, such as identifying objects within the imaging data, determining pixel locations of objects relative to optical axes of the imaging devices, and/or determining optical rays associated with the determined pixel locations. The three-dimensional mapping module 934 may perform processing to calculate and/or build three-dimensional representations or renderings of spaces using aerial vehicle location information, aerial vehicle pose information, and/or optical axis information, as well as pixel locations and/or optical rays associated with identified objects, to identify intersections between optical rays with a threshold degree of confidence, and/or to determine locations and/or ranges of objects relative to one or more aerial vehicles.

The network interface 940 may be configured to allow data to be exchanged between the object tracking control system 120, other devices attached to a network, such as other computer systems, aerial vehicle control systems of aerial vehicles, other control stations and/or other object tracking control systems 120. For example, the network interface 940 may enable wireless communication between numerous aerial vehicles, control stations, and/or object tracking control systems 120. In various implementations, the network interface 940 may support communication via wireless general data networks, such as a Wi-Fi network. For example, the network interface 940 may support communication via telecommunications networks such as cellular communication networks, satellite networks, and the like.

Input/output devices 950 may, in some implementations, include one or more visual output devices, audio input/output devices, input devices such as touchscreens, keyboards, or mice, image capture devices, other sensor described herein, etc. Multiple input/output devices 950 may be present and controlled by the object tracking control system 120.

As shown in FIG. 9, the memory may include program instructions 922 which may be configured to implement the example processes and/or sub-processes described above. The data storage 924 and other information and data 926 may include various data stores for maintaining data items that may be provided for determining locations and/or poses of aerial vehicles, determining optical axes of imaging devices, processing imaging data, determining pixel locations of objects relative to optical axes, determining directional or optical rays associated with pixel locations of objects, generating three-dimensional mapping information, identifying intersections between optical rays, determining locations and/or ranges of identified objects, instructing aerial vehicles, and any other functions, operations, or processes described herein.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Each process described herein may be implemented by the architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

Those skilled in the art will appreciate that the aerial vehicle control system 220 and the object tracking control system 120 are merely illustrative and are not intended to limit the scope of the present disclosure. In particular, the computing systems and devices may include any combination of hardware or software that can perform the indicated functions, including computers, network devices, internet appliances, PDAs, wireless phones, pagers, etc. The aerial vehicle control system 220 and the object tracking control system 120 may also be connected to other devices that are not illustrated, or instead may operate as stand-alone systems. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 220 or the object tracking control system 120. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the aerial vehicle control system 220 or the object tracking control system 120 may be transmitted to the aerial vehicle control system 220 or the object tracking control system 120 via transmission media or signals, such as electrical, electromagnetic, or digital signals, conveyed via a communication medium, such as a network and/or a wireless link. Various implementations may further include receiving, sending or storing instructions and/or data implemented in accordance with the foregoing description upon a computer-accessible medium. Accordingly, the techniques described herein may be practiced with other aerial vehicle control system or other object tracking control system configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes and systems as illustrated in the figures and described herein represent example implementations. The processes and systems may be implemented in software, hardware, or a combination thereof in other implementations. Similarly, the order of any process may be changed, and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A computer-implemented method to track airborne objects, comprising:
   receiving, from a first aerial vehicle of a plurality of aerial vehicles:
      first location information associated with the first aerial vehicle;
      first pose information associated with the first aerial vehicle;
      first optical axis information associated with a first imaging device of the first aerial vehicle; and
      first imaging data from the first imaging device of the first aerial vehicle;
   identifying a first object within the first imaging data;
   determining a first pixel location of the first object within the first imaging data;
   determining a first optical ray associated with the first pixel location of the first object;
   receiving, from a second aerial vehicle of the plurality of aerial vehicles:
      second location information associated with the second aerial vehicle;
      second pose information associated with the second aerial vehicle;
      second optical axis information associated with a second imaging device of the second aerial vehicle; and
      second imaging data from the second imaging device of the second aerial vehicle;
   identifying a second object within the second imaging data;
   determining a second pixel location of the second object within the second imaging data;
   determining a second optical ray associated with the second pixel location of the second object;
   determining that the first optical ray and the second optical ray intersect with a threshold degree of confidence, such that the first object and the second object are a same object;
   determining at least one of a location or a range of the same object relative to at least one of the first aerial vehicle or the second aerial vehicle; and
   instructing the at least one of the first aerial vehicle or the second aerial vehicle to navigate to avoid the same object based at least in part on the determined at least one of the location or the range of the same object relative to the at least one of the first aerial vehicle or the second aerial vehicle.

2. The computer-implemented method of claim 1, wherein the first location information includes first latitude, longitude, and altitude information, and the second location information includes second latitude, longitude, and altitude information.

3. The computer-implemented method of claim 1, wherein the first pose information includes first roll, pitch, and yaw information, and the second pose information includes second, roll, pitch, and yaw information.

4. The computer-implemented method of claim 1, wherein the first optical axis information includes a first direction of a first optical axis of the first imaging device relative to a first frame of the first aerial vehicle, and the second optical axis information includes a second direction of a second optical axis of the second imaging device relative to a second frame of the second aerial vehicle.

5. A computer-implemented method to track objects, comprising:
- receiving, from a plurality of aerial vehicles, imaging data from respective imaging devices of individual aerial vehicles;
- identifying objects within the imaging data;
- determining pixel locations of the objects within the imaging data;
- determining optical rays associated with the pixel locations of the objects;
- determining that at least two optical rays intersect with a threshold degree of confidence based on at least one of location, pose, or optical axis information associated with individual aerial vehicles;
- determining that at least two objects associated with the at least two intersecting optical rays are a same object;
- determining at least one of a location or a range of the same object relative to at least one of the plurality of aerial vehicles; and
- instructing the at least one of the plurality of aerial vehicles to navigate to avoid the same object based at least in part on the determined at least one of the location or the range of the same object relative to the at least one of the plurality of aerial vehicles.

6. The computer-implemented method of claim 5, further comprising:
- receiving, from the plurality of aerial vehicles, the at least one of location, pose, or optical axis information associated with individual aerial vehicles.

7. The computer-implemented method of claim 6, wherein the location information includes latitude, longitude, and altitude information received from at least one of a global positioning system (GPS) sensor or an altimeter associated with individual aerial vehicles.

8. The computer-implemented method of claim 6, wherein the pose information includes roll, pitch, and yaw information received from at least one of an inertial measurement unit, an accelerometer, or a gyroscope associated with individual aerial vehicles.

9. The computer-implemented method of claim 6, wherein the optical axis information includes directions of fixed optical axes associated with respective imaging devices of individual aerial vehicles.

10. The computer-implemented method of claim 6, wherein the optical axis information includes directions of movable optical axes received from at least one of a motor controller or a position encoder associated with respective imaging devices of individual aerial vehicles.

11. The computer-implemented method of claim 5, wherein the determining pixel locations of the objects within the imaging data further comprises:
- determining a pixel location associated with an object identified within the imaging data received from a respective imaging device relative to an optical axis associated with the respective imaging device.

12. The computer-implemented method of claim 5, wherein the determining optical rays associated with the pixel locations of the objects further comprises:
- determining an optical ray associated with a pixel location of an object identified within the imaging data received from a respective imaging device based on at least one characteristic of the respective imaging device.

13. The computer-implemented method of claim 5, wherein the determining that at least two optical rays intersect with a threshold degree of confidence based on at least one of location, pose, or optical axis information associated with individual aerial vehicles further comprises:
- generating a three-dimensional mapping of the optical rays based on the at least one of location, pose, or optical axis information associated with individual aerial vehicles; and
- determining that the at least two optical rays intersect with the threshold degree of confidence based on the three-dimensional mapping.

14. The computer-implemented method of claim 13, wherein the determining at least one of a location or a range of the same object relative to at least one of the plurality of aerial vehicles further comprises:
- determining the at least one of the location or the range of the same object relative to the at least one of the plurality of aerial vehicles based on the three-dimensional mapping.

15. A system to track objects, comprising:
- a plurality of aerial vehicles having respective imaging devices; and
- a control system in communication with the plurality of aerial vehicles and having a processor configured to at least:
  - receive, from the plurality of aerial vehicles, imaging data from respective imaging devices of individual aerial vehicles;
  - identify objects within the imaging data;
  - determine pixel locations of the objects within the imaging data;
  - determine optical rays associated with the pixel locations of the objects;
  - determine that at least two optical rays intersect with a threshold degree of confidence based on at least one of location, pose, or optical axis information associated with individual aerial vehicles;
  - determine that at least two objects associated with the at least two intersecting optical rays are a same object;
  - determine at least one of a location or a range of the same object relative to at least one of the plurality of aerial vehicles; and
  - instruct the at least one of the plurality of aerial vehicles to navigate to avoid the same object based at least in part on the determined at least one of the location or the range of the same object relative to the at least one of the plurality of aerial vehicles.

16. The system of claim 15, wherein the control system is at least one of a ground-based control system, an air-based control system, or a water-based control system.

17. The system of claim 15, wherein the control system is at least one of fixed or mobile.

18. The system of claim 15, wherein the control system is comprised in at least one of the plurality of aerial vehicles.

19. The system of claim 15, wherein the control system includes at least one of an image processing module or a three-dimensional mapping module.

* * * * *